United States Patent
Van Driest et al.

(10) Patent No.: US 10,547,416 B2
(45) Date of Patent: Jan. 28, 2020

(54) MULTI-CHANNEL RECEIVER

(71) Applicant: Qorvo International PTE. LTD., Singapore (SG)

(72) Inventors: Hans Van Driest, The Hague (NL); Bram van den Bosch, Berchem (BE); Wilhelmus van Hoogstraeten, Utrecht (NL)

(73) Assignee: Qorvo International PTE. LTD., Singapore (SG)

( * ) Notice: Subject to any disclaimer, the term of this patent is extended or adjusted under 35 U.S.C. 154(b) by 31 days.

(21) Appl. No.: 15/566,932

(22) PCT Filed: Apr. 16, 2015

(86) PCT No.: PCT/NL2015/050257
§ 371 (c)(1),
(2) Date: Oct. 16, 2017

(87) PCT Pub. No.: WO2016/167641
PCT Pub. Date: Oct. 20, 2016

(65) Prior Publication Data
US 2018/0131476 A1    May 10, 2018

(51) Int. Cl.
*H04L 1/18*    (2006.01)
*H04L 27/26*    (2006.01)
(Continued)

(52) U.S. Cl.
CPC ........ *H04L 1/1854* (2013.01); *H04L 27/2662* (2013.01); *H04W 56/0085* (2013.01); *H04L 2001/0096* (2013.01); *H04W 56/0005* (2013.01)

(58) Field of Classification Search
None
See application file for complete search history.

(56) References Cited

U.S. PATENT DOCUMENTS 8,531,981 B2    9/2013  Van Driest et al.
2009/0310524 A1*  12/2009  Katsube .................. H04L 7/041
                                                            370/311
(Continued)

FOREIGN PATENT DOCUMENTS

EP          2235871 B1    8/2011
WO     2009093892 A1    7/2009

OTHER PUBLICATIONS

International Search Report and Written Opinion for PCT/NL2015/050257, dated Dec. 16, 2015, 9 pages.

*Primary Examiner* — Saumit Shah
(74) *Attorney, Agent, or Firm* — Withrow & Terranova, P.L.L.C.

(57) ABSTRACT

Multi-channel listening capable receiver capable of operating on one of K data channels and method of operating such a receiver. A local oscillator (2) is provided for tuning the receiver (1) to one of the channels within a channel switching time Ts, as well as a processing unit (9) arranged to detect a presence of a preamble on the tuned channel. The processing unit (9) is further arranged to switch over the local oscillator (2) to a next one of the data channels if no presence of a preamble is detected within a single preamble symbol duration Tp. The channel switching time is a fraction β of a single preamble symbol period Tp. The number of data channels K fulfills the condition K<floor (N−1−(K*β)) to be able to receive all relevant data packets on the K channels, after being triggered by reception of the preamble.

14 Claims, 7 Drawing Sheets

(51) Int. Cl.
*H04W 56/00* (2009.01)
*H04L 1/00* (2006.01)

(56) References Cited

U.S. PATENT DOCUMENTS

| | | | | |
|---|---|---|---|---|
| 2010/0002811 A1* | 1/2010 | Razazian | H04L 1/0045 | |
| | | | 375/340 | |
| 2010/0034326 A1* | 2/2010 | van Driest | H04B 7/0811 | |
| | | | 375/343 | |
| 2011/0070850 A1* | 3/2011 | Kwon | H04B 7/06 | |
| | | | 455/129 | |
| 2013/0176878 A1* | 7/2013 | Lee | H04B 7/0805 | |
| | | | 370/252 | |
| 2015/0365224 A1* | 12/2015 | Waheed | H04B 3/542 | |
| | | | 370/509 | |

* cited by examiner

MULTI-CHANNEL RECEIVER

This application is a 35 USC 371 National Phase filing of PCT/NL2015/050257, filed Apr. 16, 2015, the disclosure of which is incorporated herein by reference in its entirety.

FIELD OF THE INVENTION

The present invention relates to a method of operating a multi-channel listening capable receiver capable of operating on one of K data channels, K being an integer larger than 1, wherein synchronization with a remote device is accomplished based on detection of a preamble transmitted by the remote device comprising N identical preamble symbols each having a preamble symbol duration Tp, N being an integer larger than 1. This may be followed by a transmission by the multi-channel listening capable receiver of an acknowledgment data message upon correct reception of the data message from the remote device.

PRIOR ART

International patent publication WO2009/093892 discloses an arrangement for determining a characteristic form of an input signal, which may be applied specifically in low data rate RF communication networks, such as networks employing the IEEE 802.15.4 standard.

SUMMARY OF THE INVENTION

The present invention seeks to provide an improved operation of an RF receiver allowing more efficient channel selection and channel agility, as well as providing efficient operation in multi-channel listening to cover networks operating on different channels with a single receiver.

According to the present invention, a method according to the preamble defined above is provided, the method comprising tuning the multi-channel listening capable receiver to one of the K data channels within a predetermined channel switching time Ts, detecting a presence of the preamble on the tuned one of K data channels, and switching over to a next one of the K data channels if no presence of a preamble is detected within a single preamble symbol duration Tp. The predetermined channel switching time Ts is a fraction β of a single preamble symbol period Tp. The fraction β is between 0 and 1, in typical implementations 0.25. Under ideal RF performance and under the assumption that all the relevant data packets do not overlap in time, this allows to implement a single receiver listening out on the K channels (sequentially) in a manner fast enough to be able to receive all relevant data packets, after being triggered by reception of the preamble, if the condition K≤floor (N−1−(K*β)) is fulfilled. Here the function 'floor ( )' means the largest previous integer.

The multi-channel listening capable receiver may comprise an antenna diversity input part in a further embodiment, having L antenna inputs, L being an integer larger than or equal to 2, and the method further comprises switching over to another one of the L antenna inputs if no presence of a preamble is detected within a single preamble symbol duration Tp. This allows to also, or additionally, use antenna diversity schemes to be employed in the receiver configuration. Under ideal RF performance and under the assumption that all the relevant data packets do not overlap in time, this allows to implement a single receiver listening out on the L antenna inputs on each of the K channels (sequentially) in a manner fast enough to be able to receive all relevant data packets, after being triggered by reception of the preamble, if the condition L*K≤floor (N−1−(K*β)) is fulfilled.

In a further embodiment, the method further comprises disabling the preamble detection on one or more of the K data channels, which allows an extension of the present invention embodiments to overcome blind periods during RSSI measurements (or the like) for a channel agility procedure.

In an even further extension embodiment, the method comprises disabling transmission of an acknowledgment message on one or more of the K data channels. This allows to combine a low latency during channel recovery with channel steering.

A further aspect of the present invention relates to a multi channel listening capable receiver capable of operating on one of K data channels, K being an integer larger than 1, wherein synchronization with a remote device is accomplished based on detection of a preamble transmitted by the remote device comprising N identical preamble symbols each having a preamble symbol duration Tp, N being an integer larger than 1. The multi-channel listening capable receiver comprises a controllable local oscillator for tuning the multi-channel listening capable receiver to one of the K data channels within a predetermined channel switching time Ts, and a processing unit connected to the controllable local oscillator and arranged to detect a presence of the preamble on the tuned one of K data channels. The processing unit is further arranged to switch over the controllable local oscillator to a next one of the K data channels if no presence of a preamble is detected within a single preamble symbol duration Tp (and to implement the further method embodiments of the present invention).

Furthermore, the present invention relates to a single channel radio apparatus provided with a multi-channel listening capable receiver according to any one of the present invention embodiments.

SHORT DESCRIPTION OF DRAWINGS

The present invention will be discussed in more detail below, using a number of exemplary embodiments, with reference to the attached drawings, in which FIGS. 1a and b show timelines of a selected channel by a target device, and the associated packet traffic, respectively, of a prior art implementation of a receiver.

DETAILED DESCRIPTION OF EXEMPLARY EMBODIMENTS

The present invention embodiments may be used in general in radio frequency (RF) receivers (or more general transceivers), and more specifically in direct sequence spread spectrum (DSSS) receivers. E.g. in IEEE 802.15.4 low power receiver solutions the present invention embodiments may be applied in the preamble detection. IEEE 802.15.4 transceivers are used for ZigBee applications, such as ZigBee RF4CE (for Remote controls, Human Interface Devices), ZigBee Pro (for Home Automation, Building Automation, etc.), ZigBee IP (for Smart Energy) and ISA100.11a/Wireless Hart (for Industrial Applications). It is likely that at a single location, several of these applications are used, e.g. in a sensor network. If several applications are used at the same location, usually each will use a different channel frequency. A single device can be part of more than one of these application. With current solutions, this means multiple receivers are needed for such a device.

An IEEE 802.15.4 packet starts with a synchronization header SHR. The SHR comprises a preamble sequence and a start of frame delimiter SFD. The preamble sequence is a sequence of 8 identical data symbols ("0"). A data symbol is mapped into a continuous string of 32 pseudo noise (PN) code symbols also called "chips". A data symbol corresponds to 4 bits. The IEEE 802.15.4 distinguishes 16 difference data symbols ("0" through "15"), wherein each data symbol is mapped on one out of 16 different 32-chip PN sequences that provide coding distance.

The preamble is a period in which the available bandwidth in a transmission channel is used for synchronization purposes, but no data is communicated. For optimum bandwidth utilization this "overhead" has to be as small as possible. Furthermore, in a low power network system such as ZigBee, the data message transmitted should comprise as little "overhead" as possible. In the IEEE 802.15.4 standard, the preamble is 8 symbols long.

A transmission signal according to the 802.15.4 standard is based on Minimum-Shift Keying (MSK) or Offset Quadrature Phase-Shift Keying (OQPSK) with half-sinusoidal pulses. MSK is a digital modulation scheme that conveys data by altering the carrier frequency and using a modulation index h=0.5. An MSK signal can be thought as a special form of OQPSK where the base band rectangular pulses are replaced with half-sinusoidal pulses.

ZigBee RF4CE is one of the many standards that use the IEEE 802.15.4 standard for its PHY/MAC layer. In ZigBee RF4CE, two types of devices exist. In the most typical case, a target device (e.g. a television set) receives data packets from a set of controller (remote) devices (e.g. remote controls) and acknowledges them appropriately. The target device might thus be called a transceiver, as it needs to receive and process received signals, and to acknowledge reception to the controller device using the same transmission channel.

Each target device is free to select the best operating channel from a set of three channels, based on interference information (e.g. RSSI measurements) it gathers from these channels. The procedure that gathers the interference information and decides on the optimal frequency to use is called Channel Agility procedure. The design of this Channel Agility is up to the system implementer or manufacturer of devices or components.

Figure 1A:
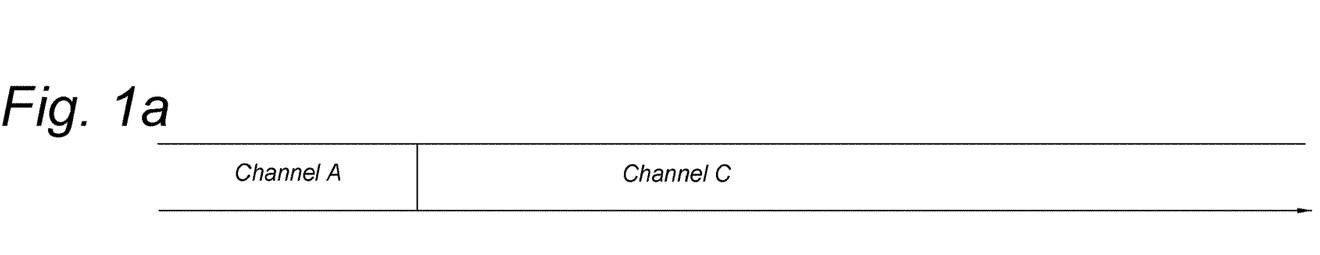
Figure 1B:
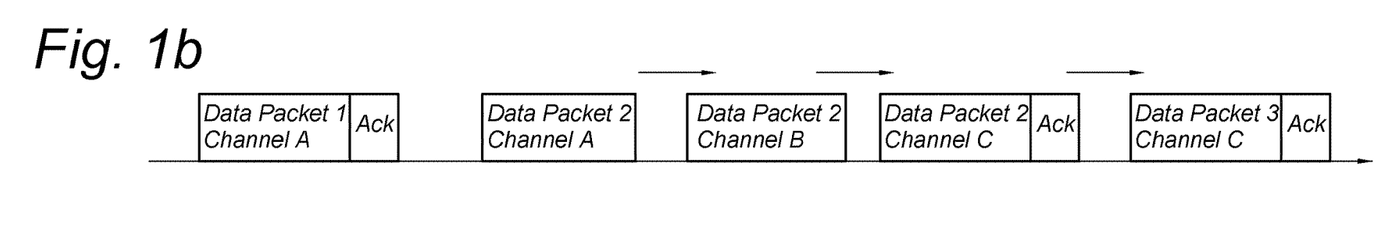

The target device is free to change the operating channel at any moment in time, without informing the controller devices that transmit data packets to the target device. FIG. 1a shows a timeline of the specific channel selected by the target device and FIG. 1b shows the associated timeline of data packets transmitted by the controller device and acknowledged by the target device.

In case the target device changes its operating channel as shown in FIG. 1a, the controller device reacquires the operating channels using the Channel Recovery procedure: The controller device that sends packets to the target device can reacquire the operating channel of the target device by checking if the packet is acknowledged. If this is not the case, the controller device will re-transmit the packet on each of the other available channels until an acknowledgement is received. This acknowledgement from the target device to the controller device will be sent after the data packet has been received at the channel which is the new operating channel of the target device.

Figure 2A:
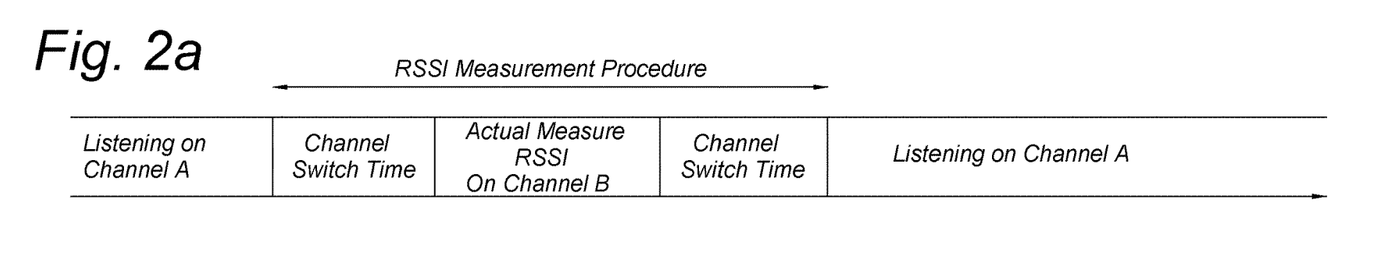
FIGS. 2a and b show timelines of a target device activity when executing an RSSI measurement, and a remote (controller) device activity on the first channel.
Figure 2B:
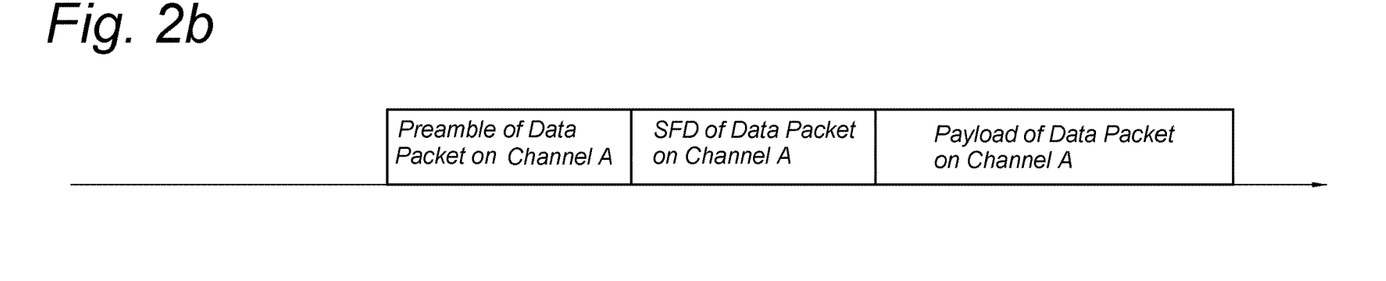

To gather interference information from one of the available channels, different from the operating channel, prior art implementations were conceived which have to switch their receiver channel from the operating channel to one of the other available channels and perform an RSSI or ED (Energy Detect) Measurement Procedure to measure the interference conditions of the other channels out of the set of 3 channels. In 802.15.4, the RSSI Measurement Procedure takes a time longer than the preamble, as shown in the timelines of FIG. 2a (target device activity) and 2b (controller device activity). The receiver is tuned to a channel different from the operating channel for a time longer than the duration of the preamble. This implies that there is a chance that the preamble of the packet on the operating channel is missed and the packet is not received. Because of this, prior art implementations either 1) will not collect RSSI information for the channels other than the operating channel completely and stay tuned to the operating channel continuously and gather only RSSI information from this channel, or 2) will collect RSSI information for the other channel once at longer intervals (e.g. once every 10 seconds).

It would be beneficial if a means could be found to handle different channel frequencies with a single receiver, i.e. without simultaneous reception or transmission of data packets on the different channels. Or rather, when a single receiver could listen for a preamble of an arriving packet at different channel frequencies, within the duration of such preamble. And if this could be done fast enough, so as to ensure that no preamble of any arriving packet on any of these channel frequencies is missed. In other words, the present invention provides for a multi channel listening implementation that can trigger a single channel reception of data packets.

Figure 3:
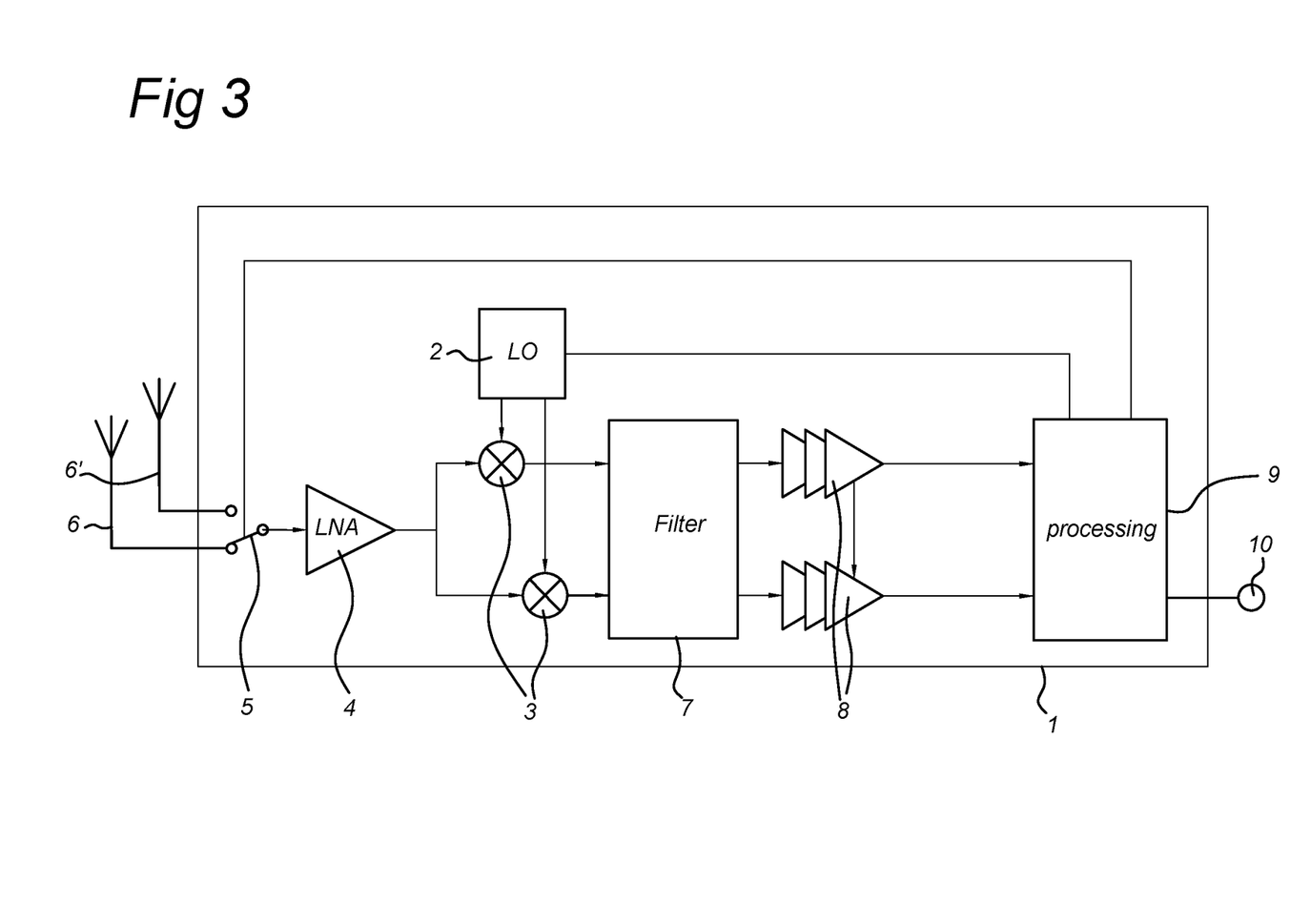
FIG. 3 shows a schematic circuit diagram of a receiver part of a receiver according to an embodiment of the present invention.

The present invention embodiments can be implemented in a receiver architecture as shown schematically in the block diagram of FIG. 3. This receiver architecture may be part of the multi-channel listening capable receiver as discussed herein. E.g. for the IEEE 802.15.4 implementation as discussed above, the receiver like architecture would be augmented with a transmission part to allow sending acknowledgment messages, but for clarity the elements forming the transmission part are left out of the block diagram of FIG. 3. Two antennas 6, 6' at the input are intended to allow implementation of antenna diversity, which is known as such.

FIG. 3 shows a simplified block diagram of a receiver 1 according to a group of embodiments of the invention, allowing also to implement the present invention method embodiments. The receiver 1 in the embodiment shown is connected to two antennas 6, 6' for receiving a RF-signal, and one of the two antennas inputs is selected by a controlled switch 5 (e.g. controlled by a processing unit 9 of the receiver 1). The RF-signal of the antenna is first amplified by a low noise amplifier LNA 4. The frequency spectrum of the output signal of the LNA 4 is shifted in frequency to centre around an intermediate frequency IF. The output signal of the LNA 4 is supplied to two mixing units 3, configured for simple mixing (multiplication) of the input signal with a CW (continuous wave) signal generated by a LO (local oscillator) unit 2 and the 90° shifted version of this CW signal. This operation results in a double sided spectral output. One of the signals resulting from the simple mixing is centred around the desired IF, $f_{IF}$, and the other one is centred around $-f_{IF}$. In practice this means that the receiver would be not be able to distinguish between an input at $f_{LO}-f_{IF}$ and $f_{LO}+f_{IF}$. By using a local oscillator 2 with a complex output (in-phase and quadrature component) and mixing the input signal with these two LO outputs, a complex signal is obtained on which distinction can be made between the positive and negative spectral components. A filter 7 (e.g. a single side-band filter) is applied on the output signals obtained by the mixing units 3 to suppress one of the two spectral components. The outputs of the single side-band filter 7 are then amplified by hard limiting amplifiers 8 and quantized and processed by processing unit 9, into an eventual output signal 10. The radio design concept of this receiver architecture is based on a low-IF stage with a hard limiting IF (because of the settings of the LNA 4). A big advantage of this radio design is that there is no need to adapt to the received signal level as with a linear receiver that uses an automatic gain control (AGC). This radio design with hard limiting means the only thing that needs to be changed for changing from one channel to another channel is the LO frequency. By changing the LO frequency, the frequency is tuned to another frequency (channel), e.g. under control of the processing unit 9. This can be accomplished in a short time, as there is no time needed for AGC adjustments and settling.

According to a first group of embodiments of the present invention, a method is provided of operating a multi-channel receiver (i.e. a (single) target device) capable of operating on one of K data channels, K being an integer larger than 1, wherein synchronization with a remote device is accomplished based on detection of a preamble transmitted by the remote device comprising N identical preamble symbols each having a preamble symbol duration Tp, N being an integer larger than 1. This may be followed by a transmission by a transmitter part of the multi-channel listening capable receiver of an acknowledgment data message upon correct reception of the data message (or even upon detection of the preamble). The method further comprises:

tuning the multi-channel receiver 1 to one of the K data channels within a predetermined channel switching time Ts, detecting a presence of the preamble on the tuned one of K data channels, and switching over to a next one of the K data channels if no presence of a preamble is detected within a single preamble symbol duration Tp.

In specific applications like IEEE 802.15.4 Zigbee, the number of available channels K is e.g. 6, and the number of repeated preamble symbols N is e.g. 8. In more general terms, when taking the channel switching time is taken as negligible (e.g. due to a smart implementations combined with very fast local oscillator switching), a maximum number of data channels allowed using this method is determined by the formula K≤N−2.

In a further aspect, and with reference to the schematic block diagram of FIG. 3 discussed above, a further group of embodiments is provided as a multi-channel receiver i.e. the single target device capable of operating on one of K data channels, K being an integer larger than 1, wherein synchronization with a remote device is accomplished based on detection of a preamble (in a synchronization header SHR) transmitted by the remote device comprising N identical preamble symbols each having a preamble symbol duration Tp, N being an integer larger than 1. The multi-channel receiver 1 comprises:

a controllable local oscillator 2 (e.g. in the form of a frequency synthesizer) for tuning the multi-channel receiver 1 to one of the K data channels within a predetermined channel switching time Ts, a processing unit 9 connected to the controllable local oscillator 9 and arranged to detect a presence of the preamble on the tuned one of K data channels, wherein the processing unit 9 is further arranged to switch over the controllable local oscillator 2 to a next one of the K data channels if no presence of a preamble is detected within a single preamble symbol duration Tp. Again, in a specific embodiment, K=6 and N=8.

Figure 4:
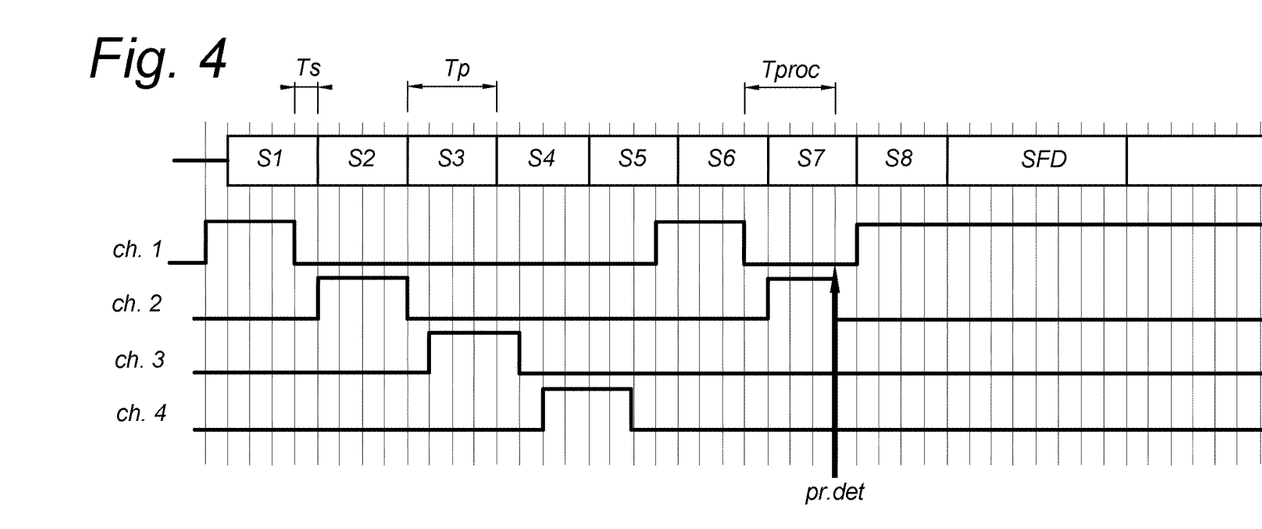
FIG. 4 shows a timing diagram of an embodiment of the present invention.

The timing parameters Tp and Ts are indicated in the exemplary timeline of FIG. 4, which shows an exemplary implementation for a receiver 1 having a single antenna and four channels, in a set-up where the preamble has eight identical symbols S1-S8 before a start-of-frame-delimiter (SFD): K=4, N=8, wherein each symbol is transmitted in a preamble symbol duration Tp.

In the timeline, the activity of the multi-channel receiver 1 is shown, which subsequently tunes to channel 1 through 4, with a channel switching time indicated by Ts. This parameter Ts is determined by the actual implementation of the receiver, but as described above with reference to FIG. 3, this timeframe can be relatively short (e.g. one fourth of the preamble symbol duration Tp). The receiver part of the transceiver stays tuned to a channel for an entire preamble symbol duration Tp. Furthermore, the parameter Tproc is indicated as the time needed by the processing unit 9 to process all needed signals in order to be able to arrive at a determination that the preamble is detected.

As mentioned, FIG. 4 shows a timing diagram for a four channel mode of operation. The top diagram line shows elements of an arriving packet signal at channel 1. S1 to S8 are the eight preamble symbols, followed by two start of frame delimiter (SFD) symbols. The other diagram lines ch. 1, ch. 2, ch. 3, ch. 4 illustrate the receiver operation at each of four channels (ch. 1 through ch. 4). High shows the interval which provides signal samples that are used for the (correlation) processing for the channel in question. It is noted that all correlation processing takes place in the same circuit, e.g. the processing unit 9 as shown in and discussed with reference to FIG. 3. FIG. 4 shows four lines to differentiate between the processing for four channels.

When a transmitted packet arrives the receiver has no timing information on this arriving packet signal. Further there will be some frequency offset between transmitter and receiver. As a result of the unknown timing, the arriving packet can start at any position in relation to the high-low states for ch. 1, ch. 2, ch. 3, ch. 4.

In the example shown in FIG. 4, the arriving packet is transmitted at channel 1 and the packet starts when the channel 1 high-low state is high. The arriving packet starts when the correlation interval for channel 1 is already in process for one quarter of the correlation interval. As a result, the presence of preamble signal is not detected and the receiver continues with processing for the other three channels.

In this example there is between the processing intervals for successive channels a gap of ¼th of a (preamble) symbol interval (4 µs; ¼ of 16 µs). This gap corresponds to the time needed for the LO to change channel frequency.

The predetermined channel switching time Ts is a fraction β of a single preamble symbol period Tp, The fraction β is between 0 and 1, in typical implementations 0.25.

So in generic terms, to be able to receive all relevant data packets on the K channels, after being triggered by reception of the preamble, under ideal RF performance and under the assumption that all the relevant data packets do not overlap in time, the following condition needs to be fulfilled: K≤floor (N−1−(K*β)), wherein the function floor gives a largest previous integer. In the example mentioned, β would be equal to 0.25.

When in FIG. 4 channel 1 is again evaluated, there is now a preamble signal present during the full correlation interval and now a preamble is detected. The high-low state lines ch. 1, ch. 2, ch. 3, ch. 4 show the interval during which signal samples are used for the processing for the successive channels. After an interval with grabbing signal samples for say channel 1, there is a time Tproc needed to execute the correlation processing and decide-on-detect, which corresponds (as an example shown) in FIG. 4 to 1 symbol (16 µs). In FIG. 4 the arrow labelled 'pr. det.' points to the time instant at which the preamble has been detected, that is 16 µs after the second high period for channel 1.

However, at that instant the LO frequency corresponds to channel 2. Thus the channel frequency has to be changed back to that of channel 1. This takes another 4 µs. After this, the receiver is synchronised in frequency and symbol timing, and next the receiver starts its operational mode to detect of all possible data symbols and with at first waiting for the two SFD symbols, which follow on the preamble symbols (S1 through S8).

This example is intended to show worst case receiver timing (when the arrival of packet occurs during the correlator processing) for a first channel and the preamble is detected during the next correlator processing period for that first channel. This example shows that preamble detect is in time to ensure the reception of the SFD symbols. The SFD detection is essential for packet data synchronisation.

The FIG. 4 example described a receive process on 4 different channels. It is also possible to receive on two channels with two antennas 6, 6' for each channel, so as to allow for antenna diversity.

Figure 5:
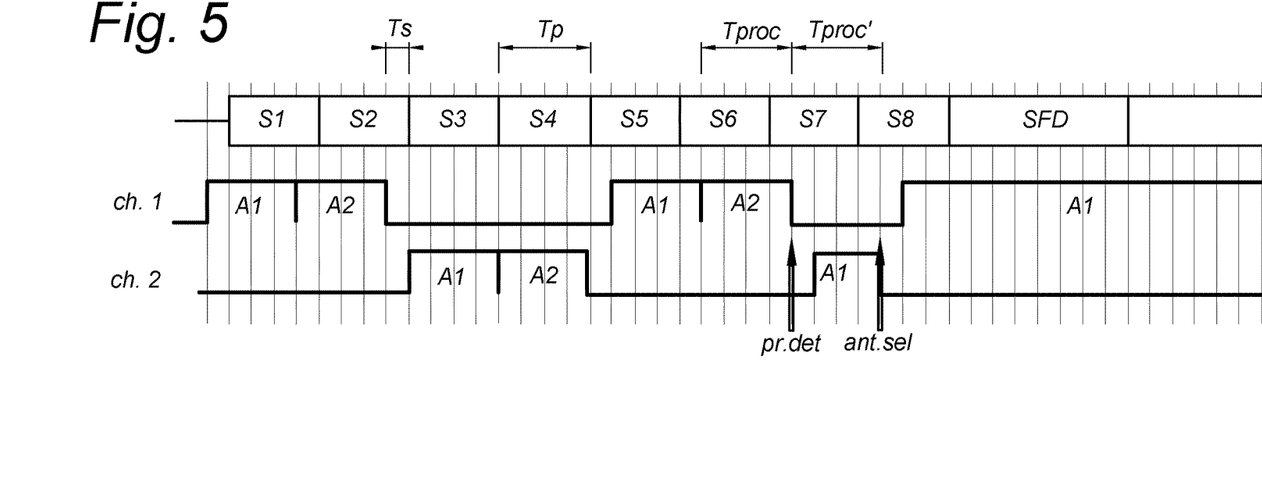
FIG. 5 shows a timing diagram of a further embodiment of the present invention.

In FIG. 5 a timeline is shown for a further embodiment, where the receiver 1 is provided with antenna diversity, i.e. two antennas 6, 6' and the associated switch 5. In this case, the receiver can subsequently receive the two antenna signals A1, A2 on the same channel, wherein the switch over between the antennas is (almost) instantaneous). In this case, after the determination about detection of the preamble has been made (taking a period Tproc), the processing unit 9 needs some further processing time Tproc' to determine the best antenna.

In the example shown in FIG. 5, the arriving packet is transmitted at channel 1 and only the signal on antenna 1 is assumed to provide a good enough signal quality (good enough SNR) to allow a preamble detection. As example the signal on antenna 2 could be very weak due fading conditions. Again (like in FIG. 4) the arriving packet signal is only present during ¾ of the correlation interval for channel 1+antenna A1. This ¾ presence is insufficient for preamble detection. When the next time the correlation interval for channel 1+antenna A1 occurs, the preamble signal is present during the full interval and the preamble detect (indicated by arrow labelled 'pr. det.') is made after 16 µs (Tproc). This worst case situation for a arriving packet with respect to channel 1+antenna A1 is early enough to allow a SFD detect in time.

As noted above, there is no gap between the correlation intervals for antenna A1 and antenna A2, since the crosstalk between antennas 1 and 2 due to switching, is regarded to be so small and can be ignored. It is possible to take this embodiment even further to a three channel mode with antenna diversity, or a six channel mode without antenna diversity.

In the embodiments described above, it is possible to detect a preamble (and perform the needed synchronisation) within half of the preamble duration (of eight symbols). The present invention embodiments provides preamble detection based on processing signal information that is present during the preamble for the duration of just a single preamble symbol Tp.

In another embodiment, wherein the multi-channel receiver 1 comprises an antenna diversity input part (or switch) 5 having L antenna inputs, L being an integer larger than or equal to 2, the method further comprising switching over to another one of the L antenna inputs if no presence of a preamble is detected within a single preamble symbol duration Tp. The switching over can be implemented as being under control of the processing unit 9. It is noted that antenna diversity lowers the number of possible channels K with a given number N of preamble symbols, since now the condition L*K≤floor (N−1−(K*β)) needs to be fulfilled to be able to receive all relevant data packets on the K channels, after being triggered by reception of the preamble, under ideal RF performance and under the assumption that all the relevant data packets do not overlap in time. Furthermore it would be conceivable that not each channel is implemented with antenna diversity, all combinations of diversity antennas and channels is possible.

One possible solution is to find the correlation between the arriving packet signal and a single preamble symbol sequence of 32 chips. At the moment of a packet will arrive, there is no synchronization or timing information, so the correlation measurement must be performed for all possible time offsets of the preamble symbol ("0") sequence. When the correlation for one different time offsets exceeds a certain predetermined threshold, a preamble is assumed to be present in the arriving packet signal. The time offset at which this highest correlation peak occurs, refers to timing alignment between the arriving packet signal and the preamble symbol sequence with the time offset in question. The frequency offset between the transmitter of arriving packet and the receiver can be determined by measuring the correlation with a set of preamble symbol sequences each derived from the preamble symbol "0" by executing the convolution with $\exp(-j \cdot 2\pi \cdot \Delta f \cdot t)$. In addition to the time offset the best matching frequency offset ($\Delta f$) can also be determined, see e.g. the patent publication WO2009/093892 of the same applicant, which is incorporated herein by reference.

As alternative for the correlation processing in this publication, such processing can also be shown by in symbolic algebra.

The preamble sequence can be represented by a sequence of 8 times $c_0, c_1, c_2, \ldots c_{31}$ or $s_n$ with $s_n = c_{mod(n,32)}$ and n= 0, . . . , 255 (the full preamble has 8×32=256 elements).

Signal samples $\hat{s}_1, \hat{s}_{1+1}, \ldots \hat{s}_{1+31}$ of an arriving packet can be correlated with regard to 32 sequence rotated versions of $c_0, c_1, c_2, \ldots c_3$; these are:

$c_0, c_1, c_2, \ldots c_{31}$; $c_1, c_2, \ldots c_{31}, c_0, c_2, \ldots c_{31}, c_0, c_1, \ldots, c_{31}, c_0, c_1, \ldots, c_{30}$ This results in 32 different correlation results (k=0, 1, . . . 31)

$$\mathrm{Corr}(k) = \sum_{r=0}^{31} \hat{S}_{l+r} * C_{rmod(r+k,32)}$$

The maximum out of the 32 different Corr(k) refers to k which corresponds to timing alignment between $\hat{s}_{1+r}$ and $c_{r\,mod(r+k,32)}$.

Likewise such correlation can be determined with regard to a number frequency offsets $$\mathrm{Corr}(k, m) = \sum_{r=0}^{31} \hat{S}_{l+r} * C_{rmod(r+k,32)} * e^{j2\pi fTkm}$$

with m pointing to the frequency offsets $-M^*f$, $(-M+1)^*f$, . . . , 0, . . . , $(M-1)^*f$, $M^*f$ and T the duration of a chip interval. Here the maximum out of the $32^*(2^*M+1)$ different Corr(k,m) refer to the (k,m) combination with regard to timing and frequency alignment.

Likewise the same processing can be done by oversampling say four times.

In summary, in the IEEE 802.15.4 standard applications, a preamble consists of 8 times the same data symbol "0" (thus 8 identical symbols) of 32 pseudo noise (PN) code elements. This repetition within the preamble is used in the present invention embodiments to detect the preamble and perform receiver synchronisation. This preamble detect and synchronization could be made largely within the duration of the preamble. When only a part of the preamble is sufficient to be used for preamble detection, then it is even possible to evaluate the quality of the signal for two or more antennas 6, 6'.

It is thus possible to switch between channel frequencies and listen for a preamble on multiple channels, during the duration of the preamble. This allows for a single radio receiver 1 to listen for a preamble on multiple channels, in such a way that it can be ensured, within the preamble period, the receiver shall not to miss a preamble on one of the channels. It is even possible to listen on multiple channels and on each channel to two antennas 6, 6', for antenna diversity.

Once a preamble has been detected on one of the sensed channel frequencies and for one (of the two) antenna port signal(s) (with regard to best quality preamble detect condition related to both antenna port signals), the receiver will enter into a mode to operate at the channel frequency for the reception of the residual part of the PHY header and PHY payload (which contain start frame delimiter, length field and MAC frame). During the reception of this packet, the receiver cannot operate at other channels and can no longer continue to anticipate at a new arriving packet at those other channels. In case of overlap-in-time of packets transmitted on different channels, a provision with reception acknowledgement and retransmission has to resolve such an issue.

The 802.15.4 preamble consists of 8 identical symbols of 32 chips and based on the signal information for a duration of a single preamble symbol it is possible to detect the presence of a preamble and to get synchronized. With a frequency synthesizer that allows very fast switching between the receiver LO frequencies for the different channels, it is possible to detect a preamble of an arriving packet in time and get synchronized with up to six channels without antenna diversity and up to three channels in combination with antenna diversity. Such a capability with in-time preamble detection and synchronization with respect to an arriving packet that is transmitted on one of set of channels, allows a multi-channel receive function by a single radio as long there is no (often occurring) overlap-in-time between packets transmitted on this set of channels.

Figure 6:
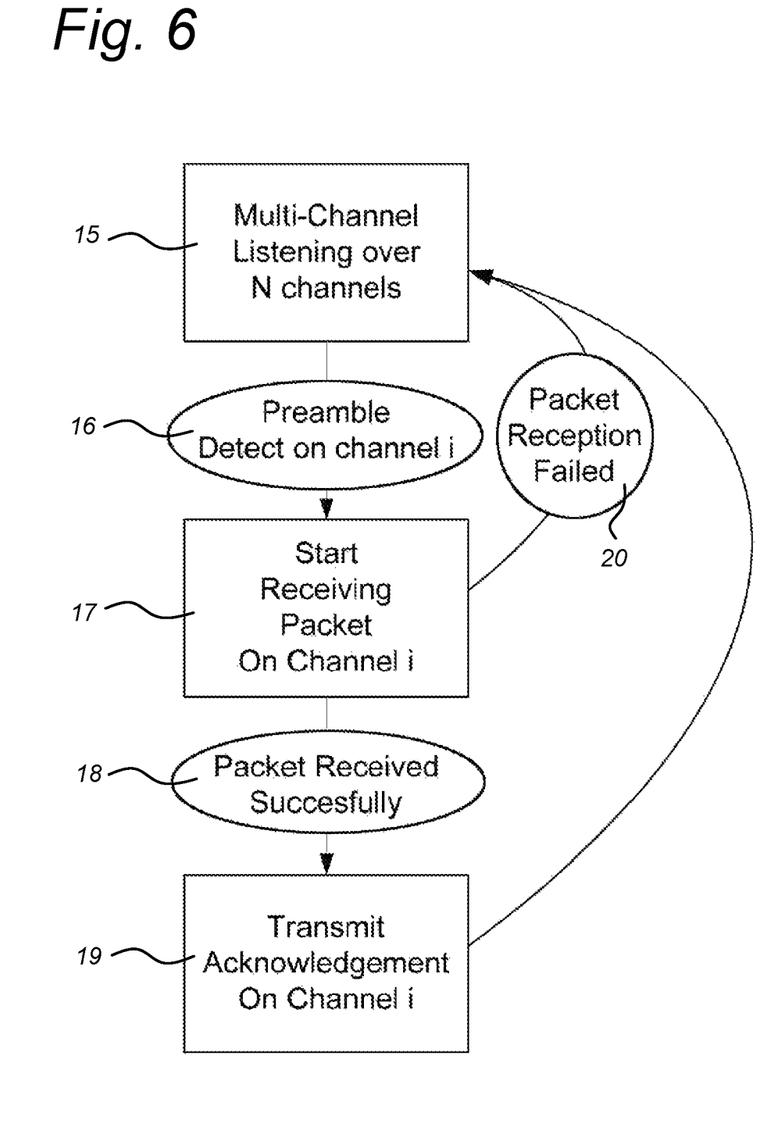
FIG. 6 shows a flow chart of an embodiment of the present invention.

FIG. 6 shows a flow chart of the present invention method embodiment as described above. In block 15, the receiver is in a state performing the multi-channel listening over N channels, as e.g. described with reference to the timeline shown in FIG. 4. Once a preamble is detected on channel i (block 16), the state transfers to block 17, starting the reception of the associated data packet on channel i. If reception of a data block fails (block 20), the receiver returns to the state of block 15. If a packet is received successfully (block 18), the receiver transfers to block 19, where an acknowledgment is transmitted on channel i.

Depending on the exact implementation of the multi-channel receiver, the number of channels that can be handled in a network can be determined based on the number N of repeating preamble symbols and further parameters. When the preamble consists of N identical preamble symbols and the channel switching is very short and the correlation processing interval is equal time to load a register that contains signal samples corresponding to one symbol interval, then K can be N–2, where N is the number preamble symbols (repeating pattern symbols). In the case of antenna diversity with two antennas, K can be (N/2)–2.

When the preamble consists of N identical preamble symbols and the channel switching timing corresponds to a fraction β of a preamble symbol, then K can be equal to the function floor(N–1–(K*β)), wherein the 'floor' function is defined at the nearest integer preceding the calculated value. This assumes the correlator processing and decision takes place during the time needed to switch (if not the time needed for correlator processing and decision has to be used with regard to the fraction β of a preamble symbol). When in addition to the moment of detecting the preamble some time is needed for full receiver synchronization and/or to switch back to the previous channel (processing+detect during channel switch time) and this corresponds to a fraction δ of a preamble symbol, then K can be=floor(N–1–(K*β)–δ). In this case, with N=8, β=0.25, δ=0.25, K can be five.

When the preamble consists of N identical preamble symbols and the channel switching timing corresponds to a fraction β of a preamble symbol the preamble correlation is based on not the full preamble processing period but only (1–β) of a preamble symbol period, then K can be=floor(N–1). This assumes the correlator processing and decision takes place during the time needed to switch (if not the time needed for correlator processing and decision has to be used with regard to the fraction β of a preamble symbol).

When in addition to the moment of detecting the preamble some time for full receiver synchronization and/or to switch back to the previous channel (processing+detect during channel switch time) and this corresponds to a fraction δ of a preamble symbol, then K can be equal to floor(N–1–δ). Thus say with N=8, δ=0.25, K can be 6.

With antenna diversity the number of channels K will be reduced further. Then the N−2 has to be divided over two antennas. With eight preamble symbols, this means three channels with antenna diversity. A mix of two antennas on Ch1 and no diversity on other channels is also possible. With three antenna diversity even other combinations are possible.

In a further group of embodiments, the advantage that a multi-channel listening capable receiver solution can be realised, is further utilized to measure the RSSI of the other channels at short intervals, while still being able to detect the preambles of the packets on the operating channel. In this way, instead of not using the RSSI information, or only using a highly subsampled version of the RSSI information, the RSSI information of all the available channels could be used as continuous stream of information, benefiting the accuracy of the channel agility procedure, and its responsiveness in case of sudden interference.

It can also be used to not only derive the interference conditions of the other channels from the RSSI measurements performed on these channels, but for example also use the number of preambles detected on these channels or any other information in the payload of the packets received on these channels, without fully receiving and processing the packets on these other channels (e.g. to processing the packet payload after extracting the MAC or NWK header).

Both these items need an extension of the multi-channel listening capable receiver to ensure that the impact on the packet error rate on the operating channels is kept limited, which is provided by further embodiments, implementing an extension of multi-channel listening to overcome blind periods during RSSI measurements for the Channel Agility procedure For the Channel Agility procedure, it is desired to monitor the RSSI on all channels. It is however not desired to receive the packets on the channels other than the operating channel, since during actual reception of a packet at one of the other channels, the receiver cannot operate at the operating channel and cannot continue to anticipate at a new arriving packets. For this purpose, the multi-channel listening capable receiver can be extended with a preamble detect disable mask that allows controlling the preamble detection process on a per channel basis.

If the bit associated with the current channel is set in this mask, the preamble detector is disabled or alternatively the preamble detection result is gated off for this channel. No packets will be received on this channel. Since the receiver is tuned to the radio frequency of this channel for a part of the preamble duration, the RSSI can be extracted in a pseudo continuous way (possible sample rate higher than 1 kHz).

If the bit associated with the current channel is unset in this mask, the preamble detector is enabled and is not gated off. Packets can be received on this channel. In addition, since the receiver is tuned to the radio frequency of this channel for a part of the preamble duration, the RSSI can be extracted in a pseudo continuous way (possible sample rate higher than 1 kHz).

Figure 7:
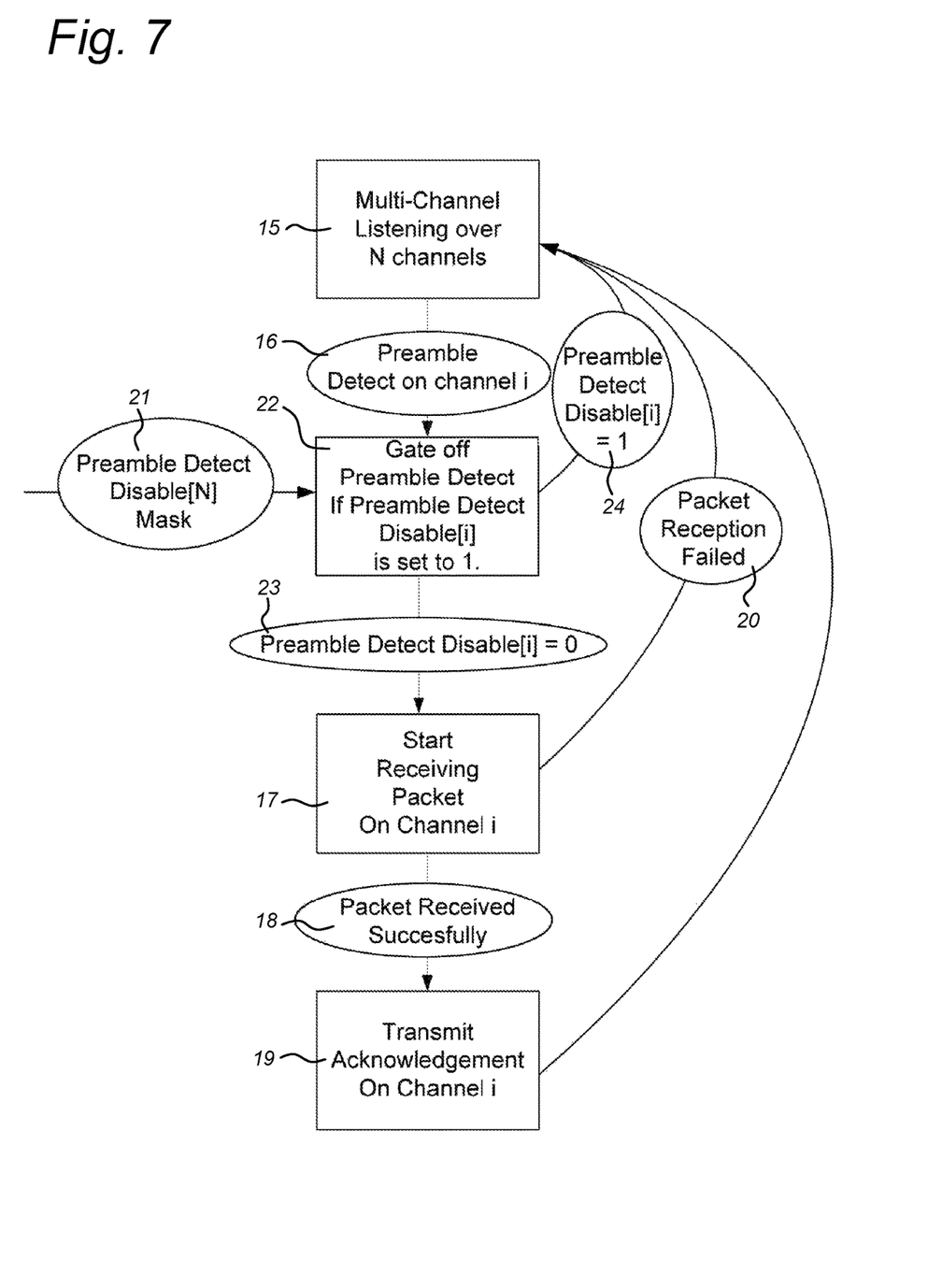
FIG. 7 shows a flow chart of an extended embodiment of the present invention.

In the flow chart as shown in FIG. 7, these additional steps are indicated. If a preamble is detected (block 16) the flow now progresses to a checking block 22, where the further processing is gated off for a subset of the channels on which the multi-channel receiver is operating, configured by a preamble detect disable mask (block 21). Only when the preamble detect disable [i] flag is 0, the flow progresses to block 17 in the normal manner. Else, the preamble detect disable [i] flag is detected as set (=1), and the flow returns to the multi-channel listening block 15.

A further group of embodiments is provided wherein the method further comprises disabling transmission of an acknowledgment message on one or more of the K data channels.

Using a present invention embodiment multi-channel listening capable receiver solution, it is possible to decrease the latency of the reception of packet by the target device, in case the controller device needs to perform the channel recovery procedure. By doing so with a multi-channel listening capable receiver without extensions, the benefit of steering the transmission channel of the packets to the most optimal channel as detected by the Channel Agility procedure is lost however. Indeed, instead of only being able to receive the packet on one of the three available channels, the target device will be able to receive the packets on all three channels, but it will also acknowledge the packets on all three channels and in this way Transmission Channel Steering is no longer available. With this embodiment's extension however, it is possible to acknowledge the packet only on the channel that is indicated to be the optimal by the Channel Agility procedure. This extension ensures that for the next packets to be sent, the controller device will transmit the packet at first on the optimal channel.

Figures 8A, 8B:
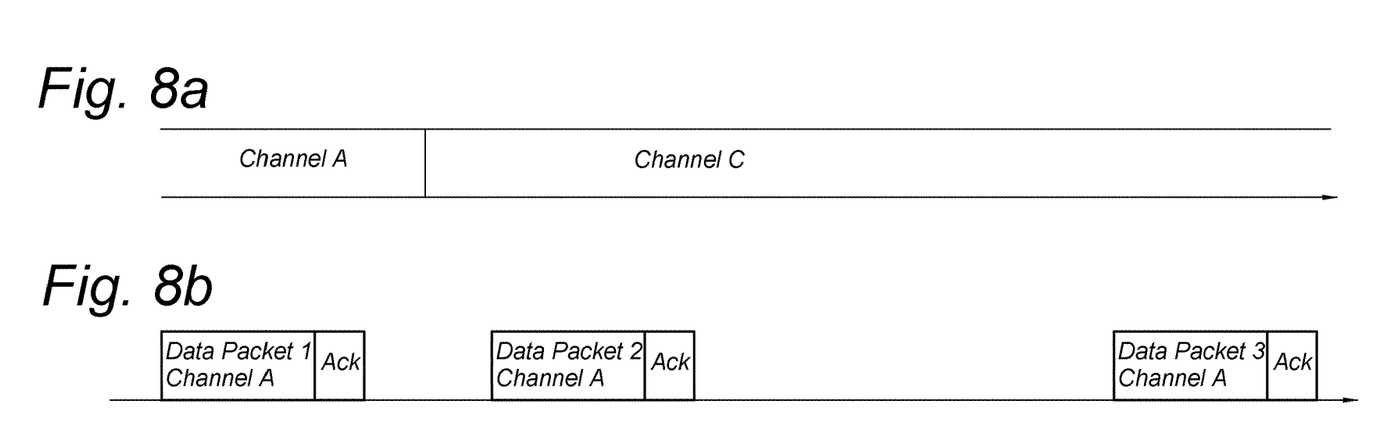
FIGS. 8a and 8b show timelines of a target device activity employing the extended embodiment of FIG. 7.

When using multi-channel listening, the receiver 1 can detect and receive packets on all the available channels. This effectively decreases the latency of the reception of a packet by the target device, in case the controller device needs to perform the channel recovery procedure. This is illustrated in the timelines of FIGS. 8a and 8b, in comparison to the timelines of FIGS. 1a and 1b, wherein FIG. 8a shows which channel is identified by the Channel Agility Procedure as the one showing the least interference (i.e. the best available channel). Since the target device is now acknowledging packets on all channels (see FIG. 8b timeline), at the same time it loses its influence on the channel that the controller device will be using for the next packets, and it can no longer steer the transmission channel in use by the controller device.

Figure 9A:
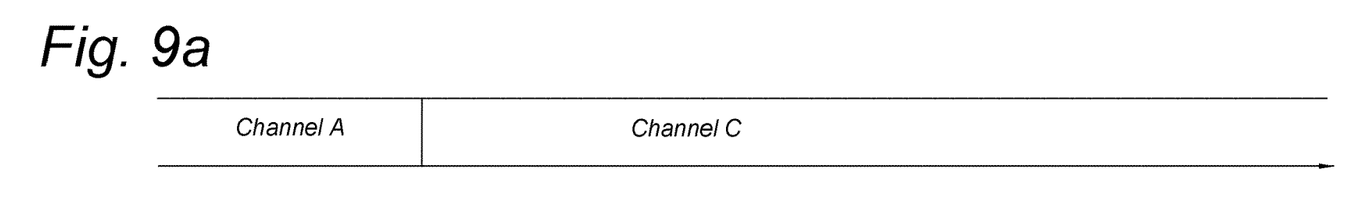
FIGS. 9a and 9b show timelines of a target device activity employing an even further extended embodiment.
Figure 9B:
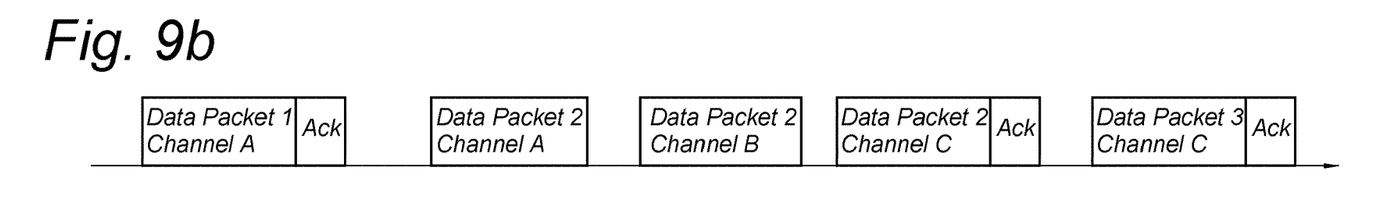

To retain this influence, and steer the channel of the controller device to the channel that is found to be the best channel by the Channel Agility procedure of the target device, the multi-channel listening capable receiver can be extended with a disable acknowledgement mask. This will result in the timelines of FIGS. 9a and 9b (in this case the acknowledgement is disabled for the channels A and B, as channel C is found to have the least interference).

Figure 10:
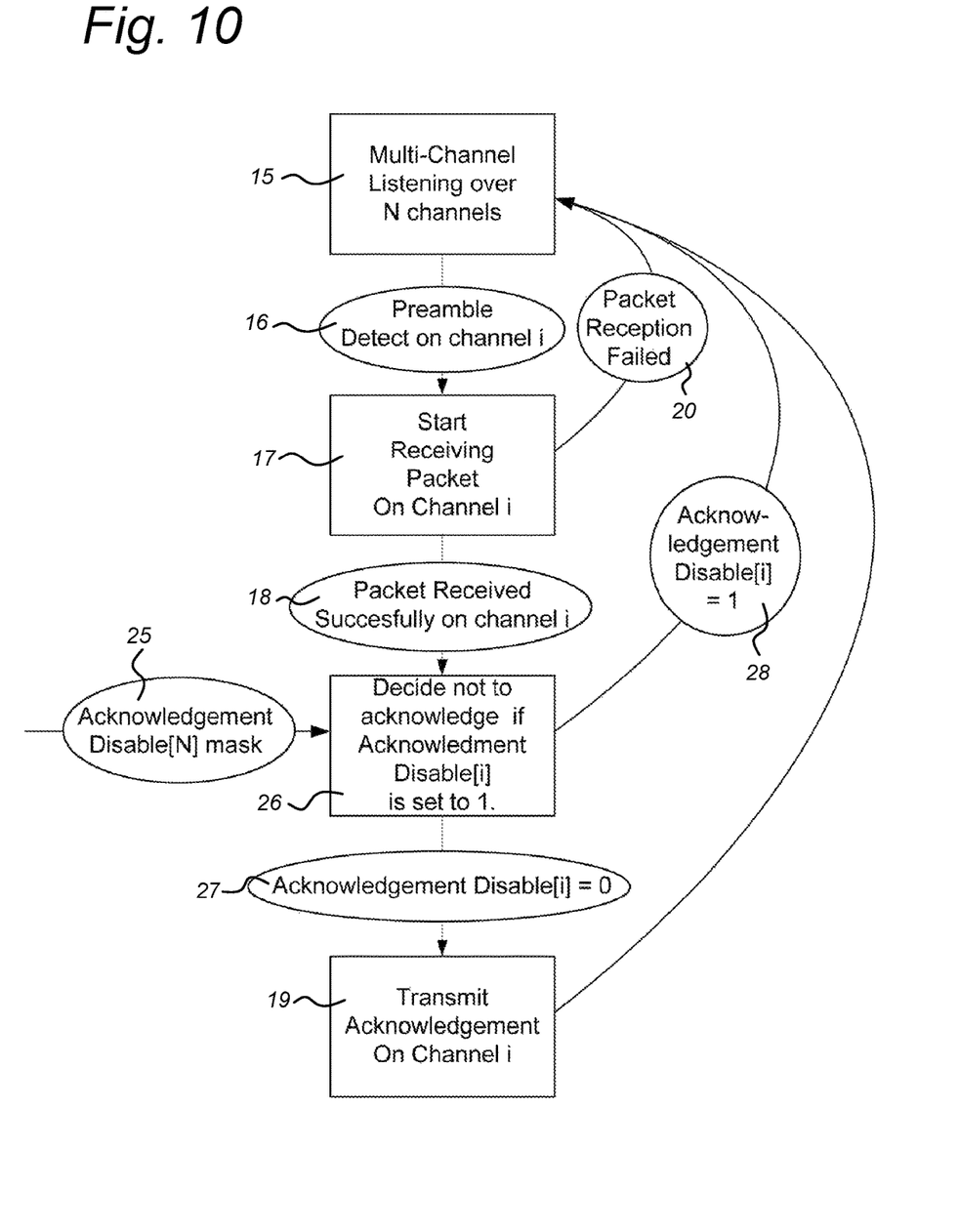
FIG. 10 shows a flow chart of the even further extended embodiment.

The additional elements in the flow chart of FIG. 10 also explain this further extended embodiment. From the start, the flow is the same as the one described with reference to FIG. 6. If a packet is successfully received on channel i (block 18), a decision block 26 is entered, receiving information from the acknowledgment disable [N] mask block 25. If the bit associated with the current channel is set in this mask (block 28), the acknowledgement generation is disabled for this channel and no packets will be acknowledged on this channel. Packets can be received however to give the benefit of the low latency. If the bit associated with the current channel is unset (block 27) in this mask, the acknowledgment generation is enabled (block 19) and packets can be received and acknowledged on this channel.

When the disable acknowledgement mask is dynamically configured such that acknowledgements are disabled on all channels different from the channel that is identified as the one showing the least interference (="Best Channel"), then this effectively allows to combine the low latency offered by the multi-channel listening with Transmission Channel Steering.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. Method of operating a multi-channel listening capable receiver capable of operating on one of K data channels, K being an integer larger than 1,
wherein synchronization with a remote device is accomplished based on detection of a preamble transmitted by the remote device comprising N identical preamble symbols each having a preamble symbol duration Tp, N being an integer larger than 1,
the method comprising:
tuning the multi-channel listening capable receiver to one of the K data channels within a predetermined channel switching time Ts,
detecting a presence of the preamble on the tuned one of K data channels, and
switching over to a next one of the K data channels if no presence of the preamble is detected within a corresponding preamble symbol duration Tp,
wherein the predetermined channel switching time Ts is a fraction $\beta$ of a single preamble symbol period Tp, with $0 \le \beta \le 1$, and the number of data channels K fulfills the condition K≤floor (N−1−(K*$\beta$)).

2. Method according to claim 1, wherein the multi-channel listening capable receiver comprises an antenna diversity input part having L antenna inputs, L being an integer larger than or equal to 2,
the method further comprising
switching over to another one of the L antenna inputs if no presence of the preamble is detected within the corresponding preamble symbol duration Tp,
wherein the number of data channels K fulfills the condition K*L≤floor (N−1−(K*$\beta$)).

3. Method according to claim 2, further comprising disabling the preamble detection on one or more of the K data channels.

4. Method according to claim 2, further comprising disabling transmission of an acknowledgment message on one or more of the K data channels.

5. Method according to claim 1, further comprising disabling the preamble detection on one or more of the K data channels.

6. Method according to claim 1, further comprising disabling transmission of an acknowledgment message on one or more of the K data channels.

7. Method according to claim 1, wherein K=6 and N=8.

8. Multi-channel listening capable receiver capable of operating on one of K data channels, K being an integer larger than 1,
wherein synchronization with a remote device is accomplished based on detection of a preamble transmitted by the remote device comprising N identical preamble symbols each having a preamble symbol duration Tp, N being an integer larger than 1,
the multi-channel listening capable receiver comprising:
a controllable local oscillator for tuning the multi-channel listening capable receiver to one of the K data channels within a predetermined channel switching time Ts,
a processing unit connected to the controllable local oscillator and arranged to detect a presence of the preamble on the tuned one of K data channels,
wherein the processing unit is further arranged to switch over the controllable local oscillator to a next one of the K data channels if no presence of the preamble is detected within a corresponding preamble symbol duration Tp,
wherein the predetermined channel switching time is a fraction $\beta$ of a single preamble symbol period Tp, with $0 \le \beta \le 1$, and the number of data channels K fulfills the condition K≤floor (N−1−(K*$\beta$)).

9. Multi-channel listening capable receiver according to claim 8, wherein the multi-channel listening capable receiver comprises an antenna diversity input part having L antenna inputs, L being an integer larger than or equal to 2, and
the processing unit is further arranged to switch over to another one of the L antenna inputs if no presence of the preamble is detected within the corresponding preamble symbol duration Tp, and wherein the number of data channels K fulfills the condition K*L≤floor (N−1−(K*$\beta$)).

10. Multi-channel listening capable receiver according to claim 9, wherein the processing unit is arranged to disable the preamble detection on one or more of the K data channels.

11. Multi-channel listening capable receiver according to claim 9, wherein the processing unit is arranged to disable transmission of an acknowledgment message on one or more of the K data channels.

12. Multi-channel listening capable receiver according to claim 8, wherein the processing unit is arranged to disable the preamble detection on one or more of the K data channels.

13. Multi-channel listening capable receiver according to claim 8, wherein the processing unit is arranged to disable transmission of an acknowledgment message on one or more of the K data channels.

14. Multi-channel listening capable receiver according to claim 8, wherein K=6 and N=8.

* * * * *